United States Patent [19]

Girsh

[11] Patent Number: 4,954,361
[45] Date of Patent: Sep. 4, 1990

[54] HYPOALLERGENIC MILK PRODUCTS AND PROCESS OF MAKING

[75] Inventor: Leonard S. Girsh, Melrose Park, Pa.

[73] Assignee: Immunopath Profile, Inc., Melrose Park, Pa.

[21] Appl. No.: 297,451

[22] Filed: Jan. 13, 1989

[51] Int. Cl.$^5$ .................... A23C 9/00; A23C 11/00; A23C 21/00

[52] U.S. Cl. ................... 426/580; 426/491; 426/583; 426/585

[58] Field of Search ............... 426/491, 580, 583, 585

[56] References Cited

U.S. PATENT DOCUMENTS

| | | | |
|---|---|---|---|
| 677,159 | 6/1901 | Meyenberg | 426/583 |
| 2,714,068 | 7/1955 | Bernhart et al. | 426/580 |
| 2,903,358 | 9/1959 | Block et al. | 426/491 |
| 3,003,882 | 10/1961 | Peat | 426/804 |
| 3,642,493 | 2/1972 | Arndt | 426/583 |
| 3,669,678 | 6/1972 | Kraft | 426/583 |
| 3,843,828 | 10/1974 | Arndt | 426/585 |
| 3,930,039 | 12/1975 | Kuipers | 426/583 |
| 3,973,234 | 8/1976 | Bosund et al. | 426/583 |
| 4,018,752 | 4/1977 | Buhler et al. | 426/804 |
| 4,042,575 | 8/1977 | Eustache | 426/583 |
| 4,202,909 | 5/1980 | Pederson, Jr. | 426/583 |
| 4,293,571 | 10/1981 | Olofsson et al. | 426/657 |
| 4,341,801 | 7/1982 | Weissman | 426/583 |
| 4,358,464 | 11/1982 | Soehnlen | 426/491 |
| 4,389,425 | 6/1983 | Burr, II | 426/598 |
| 4,389,426 | 6/1983 | Reissmann et al. | 426/804 |
| 4,402,938 | 9/1983 | Collins et al. | 426/583 |
| 4,476,143 | 10/1984 | Czulak et al. | 426/804 |
| 4,518,616 | 5/1985 | Czulak | 426/583 |
| 4,528,204 | 7/1985 | Shank | 426/804 |
| 4,547,386 | 10/1985 | Chambers et al. | 426/583 |
| 4,614,653 | 9/1986 | Kakade | 426/583 |
| 4,670,268 | 6/1987 | Mahmound | 426/804 |
| 4,692,338 | 9/1987 | Irvine et al. | 426/583 |
| 4,716,120 | 12/1987 | Tsay et al. | 436/809 |

OTHER PUBLICATIONS

Sandstrom, B. et al., "Zinc Absorption from Human Milk, Cow's Milk, and Infant Formulas", Am. J. Dis. Child, vol. 137, Aug. 1983, pp. 726–729.

Primary Examiner—Donald E. Czaja
Assistant Examiner—Helen Pratt
Attorney, Agent, or Firm—Seidel, Gonda, Lavorgna & Monaco

[57] ABSTRACT

A hypoallergenic milk which has the flavor and smell of natural whole mammalian milk is disclosed herein. The hypoallergenic milk is preferably made from the ultrafiltrated permeate of cow's milk, which is substantially free of cow's milk protein and fat. The permeate is supplemented with, among other things, hypoallergenic protein and fat to meet the minimum daily nutritional requirements for milk.

25 Claims, 1 Drawing Sheet

HYPOALLERGENIC MILK PRODUCTS AND PROCESS OF MAKING

FIELD OF THE INVENTION

A hypoallergenic milk made from the permeate of mammalian milk (i.e. the protein and fat free component of cow's milk) is disclosed herein. The hypoallergenic milk has the flavor and smell of whole natural milk, but lacks the component which causes allergic reactions.

BACKGROUND OF THE INVENTION

Many persons suffer from various allergies, many of which are caused by ingesting food containing allergens.

Although the biochemistry of allergic reactions is not precisely understood, it is believed that the allergens cause, upon ingestion or other contact with the body, a specific reagin (or skin sensitizing antibody) to be formed in the bloodstream. The ability to produce reagins, chemically identified as IgE, in response to a given allergen is thought to be an inherited characteristic that differentiates an allergic person from a non-allergic person. The specificity of the allergen-reagin reaction and its dependence on molecular configuration of the allergen and reagin is similar to the antigen-antibody reaction. In this respect, the allergen molecule, which is often a protein, may be regarded as a "key" which exactly fits the corresponding structural shape of the reagin molecule which may be likened to a "lock". When the key is inserted into the lock, an allergic reaction results.

Different materials contain different allergens. Not all persons may have the reagin with which a particular allergen can react. Therefore, some persons are not allergic to particular materials. However, when a particular reagin reacts with a specific allergen, an allergic reaction results in any number or type of symptoms. Allergic reactions range from very mild symptoms to death. For example, symptoms, both mild and severe, include skin rashes (allergic eczema and urticaria), dermal symptoms, respiratory symptoms (including allergic rhinitis and bronchial asthma), gastrointestinal symptoms, and migraine. Violent illnesses have been known to include shock-like reactions, vascular collapse and allergic anaphylaxis.

Many allergists have recognized that milk contains proteins which are allergens. The allergens of cow's milk frequently cause the formation of reagins (IgE) in many persons. Thus, many persons, including both adults and children, are allergic to cow's milk.

Milk is very frequently used in popular food products. It is used not only in cooking and baking, but it is included in hidden ways as well. For example, casein, caseinate milk solids, whey, whey solids, and lactalbumin are milk products which are components of cookies, cheeses, ice cream, butter and may be used as flavoring for other food products, such as breakfast cereals, hot and cold beverages, and desserts. These products can also be found in gravies, breading, whole, dry or evaporated milk, yogurt, sherbet, breads, waffles, creamed vegetables, mashed potatoes, pudding, creamer or any diverse products such as hot dogs or spaghetti.

Milk products, which are marketed today as hypoallergenic milk, are neither uniformly hypoallergenic to all patients nor made from cow's milk. For example, heat processed milk, in which albumin is denatured, is of modest benefit to only a limited number of patients. A hypoallergenic vegetable soybean milk formulation devised in China has an objectionable smell and after taste. Hypoallergenic milk produced by the acid process which imitates the stomach's digestive process by utilizing hydrochloric acid to break up proteins, e.g. casein, has an objectionable smell and taste.

Accordingly, there is a need for a hypoallergenic milk which also has the taste and smell of cow's milk.

U.S. Pat. No. 4,293,571 discloses a process for the purification of purified protein hydrolysate. In this process, an aqueous solution of protein is subjected to hydrolysis, then is heat treated to denature the protein. The heat-treated material is then ultrafiltered to eliminate protein.

U.S. Pat. No. 4,402,938 discloses a food and method for making same from colostrum and milk. In this process, the udder of an ungulate is stimulated with an antigen-like material so that the food factor of the whey is enhanced. The enhanced milk is subsequently ultrafiltered. The retentate is discarded and the permeate is saved. Preservatives are added to the milk/colostrum prior to ultrafiltration.

SUMMARY OF THE INVENTION

A hypoallergenic milk includes (i) substantially completely deproteinized, defatted milk, (ii) hypoallergenic protein, and (iii) hypoallergenic fat.

It is an object of this invention to produce a new and useful hypoallergenic food product from mammalian milk, and from cow's milk in particular.

It is another object of this invention to obtain the good taste of natural whole milk by avoiding taste destroying processes such as acid and/or enzyme degradation and heat degradation, and by minimizing vegetable source substitutions.

DESCRIPTION OF THE FIGURE

The FIGURE is a is a photograph of an electrophoresis gel showing the electrophoresis of the following materials:

Lane 1—Non-fat dry milk.

Figure 1:
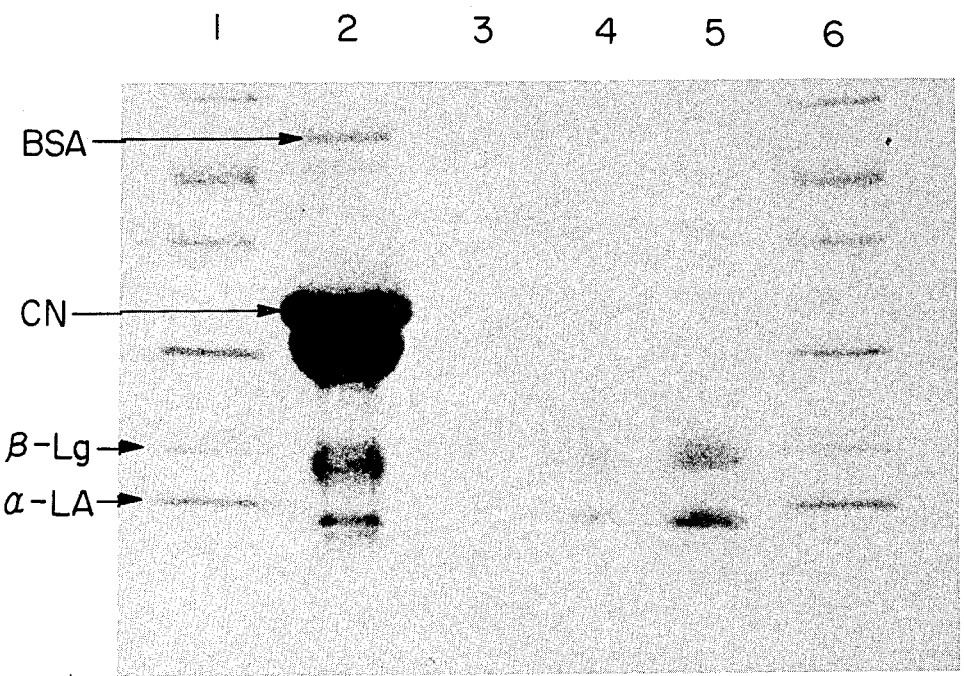

Lane 2—Whole cow's milk. (BSA"=bovine serum albumin; "CN"=casein; "$\beta$-Lg"=$\alpha$-lactalglobulin; $\alpha$-LA=$\alpha$-lactalbumin)

Lane 3—Cow's milk dialysate according to Example 4, prepared utilizing a membrane which traps 3.5 kDa and larger molecules.

Lane 4—Cow's milk permeate according to Examples 1, 2 and 3, prepared utilizing a filter which traps 5 kDa and larger molecules.

Lane 5—Cow's milk permeate prepared utilizing a filter which traps 10 kDa and larger molecules.

Lane 6—Non-fat dry milk.

DETAILED DESCRIPTION OF THE INVENTION

The hypoallergenic milk disclosed hereinafter is formulated upon the fact that protein contained in natural whole milk is the source of allergens that react with reagins to produce allergic reactions. Similar to the antigen-antibody reaction, it is believed that the allergen molecules in cow's milk, which usually are proteins, have a specific structure which acts as a "key", while the reagins have a corresponding structure which acts as a "lock". While this is the theory upon which the hyperallergenic milk is based, this theory is not meant to be limiting upon the embodiments disclosed hereinafter.

Whole mammalian milk, such as milk from, e.g., cows, sheep or goats, is filtered through an ultrafiltration apparatus to remove all hyperallergenic components. The whole milk is not pretreated, e.g. by heat denaturation, acid hydrolysis, enzyme hydrolysis or the like, prior to ultrafiltration to remove any hyperallergenic components. Any whole milk may be used. No pre-partum introduction of specific antigen-like material into the udder of an ungulate is necessary to enhance to an economic level the food factor of the whey.

According to one embodiment, an ultrafiltration membrane of the apparatus is sized to prevent the passage of any substance with a molecular weight greater than 5 kDa. Such excluded substances include, but are not limited to: milk protein; viable or non-viable bacteria; bacterial protein antigen; and milk fat. The ultrafiltration membrane, capable of preventing passage of 5 kDa molecular weight substances, has pores with diameters of about 20 angstroms. Alternately, ultrafiltration membranes which prevent the passage of any substance with a molecular weight greater than 1 or 2 kDa may also be used. Ultrafiltration membranes capable of preventing the passage of 1 or 2 kDa molecular weight substances have proportionately smaller pore sizes.

The following milk proteins are trapped by the ultrafiltration membrane (molecular weights are noted in parenthesis): alpha lactalbumin (14 kDa); kappa casein (23 kDa); beta casein (24 kDa); beta lactalglobulin (37 kDa); bovine serum albumin (65 kDa); and immunoglobulins (>100 kDa). These milk proteins are considered hyperallergenic. Beta lactalglobulin is a dimer at pH 6.6.

It has been found that decreasing the sizing, of the filter decreases the relative amount of three milk proteins —alpha lactalbumin, beta lactalglobulin and bovine serum albumin—remaining in the permeate. Thus, where 0.27, 0.33 and 0.01 units of these proteins, respectively, are found in permeates prepared with a 10 kDa membrane (i.e., a filter membrane which excludes molecules having a molecular weight greater than 10 kDa), permeates prepared with 5 kDa dalton filters contain 0.03, 0.03 and 0.01 units of these same proteins, respectively. A dialysate, as hereinafter prepared using a 3.5 kDa dialysis membrane, contains less than 0.01 units of each of these protein species, resulting in a protein-free dialysate, based upon the limits of the electrophoretic method employed to analyze for protein.

The FIGURE illustrates the effect of the various filter methods on the preparation of cow's milk filtrate according to the present invention. Lanes 1 and 6 show the separated proteins of non-fat dry milk. Lane 2 shows the proteins present in whole milk. As can be observed by comparing the various lanes, utilization of a 5 kDa membrane (Lane 4) results in a permeate free of substantially all the proteins normally present in cow's milk (Lanes 1 and 6), except for trace amounts of a few proteins evidenced by the light banding in Lane 4. A comparison of the electrophoretic patterns of Lane 4 (5 kDa filter) and Lane 5 (10 kDa filter) indicates that the 5 kDa membrane is substantially more efficient than the 10 kDa filter in excluding the proteins found in cow's milk. It should be noted from the total absence of banding in Lane 3 indicates that the 3.5 kDa dialysis membrane results in a protein-free dialysate, based upon the limit of sensitivity of the electrophoretic method employed.

Ultrafiltration membranes having a plurality of pores with diameters of about 20 angstroms or less are commercially available. One such membrane is made of a synthetic material, polysulfone, and is commercially available from Koch-Abcor Manufacturing Company. Ultrafiltration membranes made of ceramic materials may also be used.

Ceramic filters have an advantage over synthetic filters. Ceramic filters can be sterilized with live steam so that the chemical agents, such as chlorine, do not have to be used to sterilize the filter. Synthetic filters, on the other hand, cannot be sterilized with live steam, but instead they must be sterilized with chemical agents, for example, a solution of 200 p.p.m chlorine solution may be used to disinfect the membrane. If a chemical agent is used to disinfect the membrane, the chemical agent may be washed from the filter by flushing the filter with two passes of milk.

A pressure gradient is applied across the ultrafiltration membrane to facilitate filtration. Preferably, the pressure gradient is about 5 P.S.I., with the inlet pressure (i.e. the whole milk side) ranging from about 15 to about 100 P.S.I. and with the outlet pressure (i.e. the permeate side) being about 5 P.S.I. less than the inlet pressure.

The pH of the milk during filtration should be within the range of about 2 to about 11. The preferred pH is about 6.6.

The temperature of the milk during ultrafiltration should be within the range of about 40° F. to about 150° F. The preferred temperature is about 125° F.

Instead of ultrafiltration, the hyperallergenic component of whole milk may be removed by dialysis. As is well known, dialysis operates on a principal akin to osmosis. Dialysis may be more advantageous than ultrafiltration, since dialysis does not require a pressure gradient. The latter may cause some hyperallergenic components to be forced through the ultrafiltration membrane. However, this should not occur with 1 kDa, 2 kDa or 3.5 kDa ultrafilters.

With dialysis, as with ultrafiltration, the permeate that passes through the membrane, i.e. the hypoallergenic component, is saved and utilized. The retentate, i.e., the material which does not pass through the membrane, is discarded or utilized in other commercial applications. A dialysis membrane capable of preventing the passage of materials with a molecular weight of 3.5 kDa may be used. Other membranes, however, could be used so long as the hyperallergenic component is excluded from the permeate.

The permeate collected from the ultrafiltration process is free of fat, milk protein, bacteria and bacterial protein antigen. The permeate, on the other hand, contains, among other things: riboflavin (the substance which gives the permeate a yellow color); lactose (less than 5% by weight); salt or ash containing calcium; $C_7$-$C_{10}$ carbon compounds, particular the seven-carbon compound cis-4-heptanal, which is an unsaturated aldehyde; dimethyl sulfide; and other minerals typically found in pasteurized milk. These materials, as well as milk fat subsequently re-added (after deproteinization), give the enriched permeate the good taste and smell of whole milk. The retentate is of no further use in the hypoallergenic milk manufacturing process, and may be discarded or used in other processes beyond the scope of the invention, for example in the manufacture of ice cream.

The permeate which is deproteinized and defatted may be supplemented with hypoallergenic protein, fat, vitamins, minerals and flavoring so that it meets the minimum daily requirement (M.D.R.) for milk. Preservatives such as phenol, parabens etc. are preferably not added. The permeate may be supplemented, as discussed below, while in liquid form. Alternatively, it may be freeze dried in any conventional manner, then reconstituted with liquid supplements at a later time.

The supplements include, among other things, hypoallergenic protein, hypoallergenic fat, vitamins, minerals and flavoring, such as natural vanilla flavoring.

Sources of hypoallergenic protein include, but are not limited to: oat cereal (which has a high protein level of about 18%); rice cereal; barley cereal; or any other food source having a low allergenicity and ample protein content. Vegetable sources of protein may also be used, so long as they have a low allergenic potential. Vegetable sources of low allergenic protein include, for example, potato and soy isolate. Combinations of the foregoing proteins may also be used.

Oat cereal, for example oatmeal, is preferred because it not only enhances the protein content, it also adds to the taste of the resulting product. The oat cereal is used as a very finely ground flour, to facilitate dissolution into the permeate. About 5 to 10 grams of the very finely ground and sieved cereal flour is added to about 100 cc of permeate. The resulting mixture has a protein content of about 0.9 to 1.8% by weight, which is similar to human breast milk.

When cereals are used, protein soy isolate may also be added to enrich the lysine amino acid value of the cereal. Additionally, the protein may be supplemented with, among other things, methionine, cystine, and iodine to meet the minimum daily requirements (M.D.R.).

Protein soy isolate is preferred for use in hypoallergenic milk which is intended for infants, who require a single source of protein, or children and adolescents with important growth factor requirements. Cereal hypoallergenic protein sources can be used in the hypoallergenic milk for adults. For example, if a multiple source of protein is desired, any combination of hypoallergenic protein sources may be used.

The sources of fat (or lipids) may include deproteinized clear butter and butter oil or butter fat, polyunsaturated and monounsaturated vegetable oil or fat from milk free margarine sources, sesame, safflower, and the like. The foregoing sources of fat are hypoallergenic.

The fat is added to the permeate so that the fat content of the resulting mixture ranges between 0% and about 4% by weight depending upon whether skim, 1%, 2% or 4% homogenized milk is desired. For adults where atherosclerosis prevention is of great importance, the fat source may comprise about ¼ to about ½% deproteinized butter oil and/or about ½ to about 2% low fat polyunsaturated vegetable fat.

Deproteinized hypoallergenic butter for supplementing the permeate may be made from commercially available salt-free, sweet 99.99% anhydrous milk fat. The milk fat is melted in boiling water. The resulting butter oil is then removed from the boiling water, such as by pipetting it off the surface of the water. The process removes, by dilution of the milk fat with water, any protein which may be contained in the fat as a contaminant. The process may be repeated any number of times to ensure the purity of the resulting butter product.

Vitamins and minerals are also added to the protein and fat supplemented permeate. Vitamins and minerals are added to the reconstituted, modified hypoallergenic milk so that the milk meets the minimum daily requirement. By way of non-limiting example, the following may be added, based upon one quart of permeate supplemented with hypoallergenic protein and fat: 400 micrograms of water dispersible Vitamin D; 2100 micrograms of water-dispersible Vitamin A; 60 milligrams of Vitamin C acetate; folic acid; calcium pantothenate; biotin; pyridoxine; minerals such as calcium triphosphate, iron as ferrous sulfate, and zinc as zinc sulfate. The foregoing are exemplary of the vitamins and minerals that may be added to the hypoallergenic milk. Of course, other vitamins and minerals which are known to those of ordinary skill in the art may also be added.

Additives to enhance the flavor and consistency of the hypoallergenic milk may also be added. Exemplary additives include: hypoallergenic bean gum derived from guar gum (3 to 4 pounds per 1,000 gals. of hypoallergenic milk); carrageenan; and/or lecithin of hypoallergenic vegetable bean source, such as soy bean (20 lbs/1000 gallons of hypoallergenic milk). Each of these additives impart a creamy consistency (acts as an emulsifier) to the hypoallergenic milk. Natural vanilla may also be added to enhance the flavor of hypoallergenic milk.

After the hypoallergenic protein and fats, vitamins, minerals and additives to enhance flavor and consistency have been added to the permeate, the hypoallergenic milk is preferably blended in an emulsifying and diffusing apparatus operating at between about 2,500 and about 3,500 r.p.m., to ensure thorough mixing. The blended hypoallergenic milk is then homogenized at a pressure ranging from about 2,000 to about 4,000 P.S.I., pasteurized at about 170° for about 30 minutes, and then flashed sterilized at about 290° F. for about 12 seconds and packaged into a aseptic containers. Such containers are made of materials which will not leach into the packaged product. The materials include, but are not limited to, glass, waxed cardboard or metal. Alternatively, the permeate may be pasteurized before the various supplements have been added.

The meticulous removal of substantially all allergenic protein by a 20 angstrom ultrafilter or dialysis membrane has superior advantage regarding hypoallergenicity. The permeate contains at best only traces of protein that will degrade when heat denatured. Heat denaturization is equivalent to 30 minutes of pasteurization. Pasteurization comprises heating at about 170° F. for about 30 minutes. Thus, it is understood that as used herein, the expression "substantially completely deproteinized defatted" or "substantially free of milk protein and fat", in referring to a milk preparation, is meant a preparation containing possibly only trace amounts of hyperallergenic protein or fat, which upon pasteurization of the product, are readily degraded so as to be rendered hypoallergenic. The possibility of trace amounts of any hyperallergenic protein remaining in the permeate is minimized by the use of ultrafilters capable of excluding 3.5 kDa proteins, or smaller proteins.

Lactase enzyme may be added to the hypoallergenic milk for use by an older child or adult where lactose intolerance may be a consideration.

The hypoallergenic milk may be substituted for milk in any formulation in which milk is used. For example, hypoallergenic milk may be used as a beverage or in beverages, or solid food products such as candy, cookies, cakes, breakfast cereals and the like.

One non-limiting hypoallergenic milk product according to the present invention suitable for infants contains the following components, based upon 100 ml of product. The amount of each component may be adjusted according to need.

| Protein | |
|---|---|
| Soy protein isolate | 1.8 g |
| Oatmeal protein (optional) | 0.9 to 1.8 g |
| Fat | 3.78 |
| Carbohydrate | |
| Lactose | 4.6 g |
| Minerals | |
| Sodium | 41 to 49 mg |
| Potassium | 140 to 152 mg |
| Calcium | 110 to 119 mg |
| Phosphorus | 89 to 93 mg |
| Chloride | 63 to 65 mg |
| Iron (fortified) | 0.05 to 1.2 mg |
| Zinc | 0.38 to 0.43 mg |
| Iodine | 10 micrograms |
| Amino Acids | |
| Methionine | 10 micrograms |
| Cystine | 10 micrograms |
| Vitamins | |
| Vitamin A (water dispersible) | 210 International Units ("I.U.") |
| Vitamin C (as acetate) | 6.0 mg |
| Vitamin D (water dispersible) | 42 I.U. |
| Vitamin E | 1.0 mg |
| Thiamine | 0.04 mg |
| Riboflavin | 0.14 to 0.16 mg |
| Niacin | 0.08 mg |
| Pyridoxine | 0.04 to 0.05 mg |
| Vitamin $B_{12}$ | 0.32 micrograms |
| Folic Acid | 5.0 micrograms |

The invention will now be described in more detail with reference to the following specific, non-limiting examples:

EXAMPLE 1

Whole cow's milk was passed through an ultrafiltration membrane having a plurality of pores, each pore having a diameter of about 20 angstroms. The milk was maintained at a temperature of 125° F. and a pH of 6.6. Filtration was facilitated by applying a pressure gradient of about 5 p.s.i. across the membrane.

950 ml of the permeate was then supplemented with about 50 grams of a commercially available enriched soy solids powder. Such preparations contain hypoallergenic soy oil, lecithin as an emulsifier, and vitamins and minerals. Addition of the enriched soy solids powder (30 grams) to the permeate results in the enrichment of the permeate with the following vitamins and minerals (based upon one liter of soy solids enriched permeate): elemental calcium, 160 mg (as calcium carbonate) (16% of the Recommended Daily Allowance ("RDA")); ascorbic acid, 6 mg (10% RDA); vitamin E, 3.5 International Units ("I.U.") (7% RDA); vitamin A (palmitate), 350 I.U. (7% RDA); vitamin D, 160 mg (40% RDA); vitamin $B_1$ (thiamine), 0.1 mg (7% RDA); vitamin $B_2$ (riboflavin) 0.25 mg (16% RDA); niacin, 0.5 mg (3% RDA); vitamin $B_6$, 0.15 mg (7% RDA); zinc, 1.5 mg (10% RDA); pantothenic acid, 1.0 mg (10% RDA); vitamin $B_{12}$ (cyancobalamine), 3.0 micrograms (50% RDA); iron, 3.0 mg (16% RDA); potassium, 75 mg.

The addition of the enriched soy solids powder resulted in a hypoallergenic milk formulation containing about 1% protein (weight/volume) and about 1% fat (weight/volume). Constant stirring for 20 minutes resulted in a colloidal suspension.

The suspension was then pasteurized at 170° for 30 minutes in a double boiler with constant stirring. This heating in a double boiler also serves to heat denature any trace of heat-denaturable protein. The milk was then poured into four 8 ounce sterile glass bottles and refrigerated. The tan-colored colloidal suspension was found to be maintained, upon gross inspection at two hours, eight hours, and eighteen hours following preparation.

EXAMPLE 2

Whole cow's milk was passed through an ultrafiltration membrane having a plurality of pores, each pore having a diameter of about 20 angstroms. The milk was maintained at 125° F. and at a pH of 6.6. Filtration was facilitated by applying a pressure gradient of about 5 p.s.i. across the membrane.

930 ml of the permeate was then supplemented with 50 grams of enriched soy solids powder as in Example 1, and 20 grams of cleared anhydrous milk fat prepared according to Example 5. The mixture was then emulsified in an emulsifying, diffusing apparatus operating at 3500 rpms.

The addition of the enriched soy solids powder and anhydrous milk fat resulted in a hypoallergenic milk formulation containing about 1% protein (weight/volume) and about 3% fat (weight/volume).

The emulsified mixture was then pasteurized at 170° F. for 30 minutes in a double boiler with constant stirring. This heating in a double boiler also serves to heat denature any remote trace of protein. This modified milk formulation was then poured into four 8 ounce sterile glass bottles and refrigerated. The tan colored colloidal suspension was found to be maintained upon gross inspection at two hours, eight hours, and eighteen hours following preparation.

EXAMPLE 3

Whole cow's milk was passed through an ultrafiltration membrane having a plurality of pores, each pore having a diameter of about 20 angstroms. The milk was maintained at a temperature of 125° F. and a pH of 6.6. Filtration is facilitated by applying a pressure gradient of about 5 p.s.i. across the membrane.

900 ml of the permeate was then supplemented as follows:

200 grams of a very finely ground oat flour and 0.2 gram carrageenan were added to 900 ml of the cow's milk ultrafiltered permeate with constant stirring for twenty minutes. The oat flour enriched permeate was then pasteurized for 30 minutes with constant stirring in a double boiler at 170° F. This heating in a double boiler also serves to heat denature any remote trace of protein.

The formulation was then decanted into four 8 ounce sterile glass bottles and refrigerated. The tan colored colloidal suspension was found to be maintained upon gross inspection at two hours, eight hours, and eighteen hours following preparation.

Chemical analysis of the permeates of Examples 1–3 indicated 5.7% solids and 0.26% protein and other non-protein nitrogen-containing compounds (e.g. polypeptides), the latter quantity being determined according to the BCA method of *Clinical Chemistry* 32:120 (1986). The BCA method determines total nitrogen content. Gel electrophoresis, which is sensitive to 30 ng protein, revealed only trace amounts of alpha lactalbumin, beta lactoglobulin and bovine serum albumin, the remaining nitrogen content in the permeate being non-protein material. Neither casein, nor its various fragments known as the gamma caseins, were present in the permeate, as established by gel electrophoresis.

The method of the invention is effective in reducing the protein content of milk from 3.6% to 0.26%, a reduction of more than 90%. It should be noted that by utilizing a filter capable of retaining 5 kDa dalton molecular weight species, 90% more protein is removed from the permeate than with a 10 kDa filter.

The treatment of the invention effectively removes casein, gamma caseins, and all immunoglobulins. The trace amounts of the other proteins remaining in the permeate are heat denatured by the pasteurization process utilized above.

EXAMPLE 4

Fresh whole guernsey cow's milk was collected (7:30 a.m.) and separated (9:30 a.m.) from fat. The skim milk was then brought to 104° F. (40° C.) temperature for separation. The skim milk was then placed in a ice bath to a temperature of 52° F. Fourteen liters of this milk was transferred to a cold room (50° F.) and was subjected to constant stirring.

The skim milk was placed in six 90 ml, 3,500 molecular weight dialysis tubes tied at each end (i.e., species >3.5 kDa do not pass through) and dialyzed against deionized, distilled water.

The dialysate, which contained 6.1% solids, on chemical analysis revealed 0.27% protein polypeptides, and other nitrogen-containing compounds by the BCA method, *Clinical Chemistry* 32:120 (1986). Gel electrophoresis of the dialysate, which is sensitive to 30 ng protein, revealed no protein. It is significant to note that neither casein, nor its peptide fragments known as the gamma caseins, were present in the permeate, as established by gel electrophoresis.

Two hundred and forty ml of this dialysate was then mixed with 25 grams of an enriched soy solids powder as in Example 1.

The addition of the soy powder resulted in a hypoallergenic milk formulation containing about 2% protein (weight/volume) and about 2% fat (weight/volume). Constant stirring for 20 minutes resulted in a colloidal suspension.

The suspension was then pasteurized at 170° F. for 30 minutes in a double boiler with further constant stirring. This heating in a double boiler also serves to heat denature any remote trace of protein. The milk was then poured into four 8 ounce sterile glass bottles and refrigerated. The tan colored colloidal suspension was found to be maintained upon gross inspection at two hours, eight hours, and eighteen hours after preparation.

A bacteria colony count was performed on the pasteurized product of Examples 1–4. In each material, less than ten colonies per plate were visible. The products contained the following proportions of protein, as determined by the Kjeldahl protein assay: Example 1: 1.36%; Example 2: 1.06%; Example 3: 1.28%; and Example 4: 1.7%.

EXAMPLE 5

A hypoallergenic butter product substantially completely free of hyperallergenic protein may be prepared as follows:

Twenty grams of anhydrous milk fat 99.99% pure (0.01% moisture) is cleared of any possible trace of protein in 5,000 ml of boiling water, rendering a hypoallergenic butter oil. The butter oil is then pipetted off the water.

A moderately hypoallergenic milk product may be prepared from casein-free sweet whey. The latter is a commercially available by-product of cheese manufacture. Removal of casein, which is resistent to heat denaturation, allows the sweet whey to serve as the basis for a moderately hypoallergenic milk product. Accordingly, commercially available casein-free sweet whey, which is substantially free of casein, is heated to substantially completely denature the non-casein protein contained in the whey. Heat treatment at about 170° F. for about 30 minutes will generally be sufficient. Heat treatment results in the substantial denaturation of the non-casein proteins remaining in the whey, which proteins are generally heat denaturable. The heat-treated whey product may be optionally filtered through an about 500–600 angstrom millipore filter to ensure complete removal of all casein. The heat-treated whey is then supplemented with hypoallergenic protein and hypoallergenic fat, in the same manner as the various permeates described elsewhere herein, to form a milk product. The supplemented milk product is homogenized in the same manner described elsewhere herein.

The resulting milk product prepared from casein-free sweet whey may be less hypoallergenic than the products prepared from whole milk permeates. However, the whey-based product finds utility in the diets of individuals with only mild allergies to milk protein, where incompletely hypoallergenic milk products may be given.

The hypoallergenicity of the whey-based product may be enhanced by first passing the sweet casein-free whey through a highly efficient filter, such as a Koch-ABCOR polysulfone 1 or 2 kDa ultrafilter, or dialyzing the sweet whey utilizing a 3.5 kDa or smaller cellulose dialysis membrane. The resulting dialysate or permeate is then supplemented with hypoallergenic protein and fat in the same manner as the various permeates described elsewhere herein, to form a milk product. The supplemented milk product is then homogenized as described elsewhere herein.

The present invention may be embodied in other specific forms without departing from the spirit or essential attributes thereof and, accordingly, reference should be made to the appended claims, rather than to the foregoing specification, as indicating the scope of the invention.

I claim:

1. A hypoallergenic milk which has the flavor and smell of natural whole milk comprising:
    a permeate of milk, said permeate being substantially free of milk protein and fat, said permeate having been prepared by filtration of whole or skim milk through a filtration membrane without pretreating said milk to denature or hydrolyze the protein contained therein before filtration, which filtration membrane will only allow molecules with a molecular weight less than or equal to about 5 kDa to pass therethrough;
    hypoallergenic protein; and
    hypoallergenic fat.

2. The hypoallergenic milk according to claim 1 formed from a permeate of cow's milk, said permeate being free of cow's milk protein and fat.

3. The hypoallergenic milk according to claim 2 wherein said permeate is free of molecules having a molecular weight greater than about 5 kDa.

4. The hypoallergenic milk according to claim 3 wherein said permeate is free of molecules having a molecular weight greater than about 3.5 kDa.

5. The hypoallergenic milk according to claim 4 wherein said permeate is free of molecules having a molecular weight greater than about 2 kDa.

6. The hypoallergenic milk according to claim 5 wherein said permeate is free of molecules having a molecular weight greater than about 1 kDa.

7. The hypoallergenic milk according to claim 2 wherein said permeate contains materials selected from the group consisting of riboflavin, lactose, salt or ash containing calcium and combinations thereof.

8. The hypoallergenic milk according to claim 2 wherein said hypoallergenic protein is selected from the group consisting of cereal protein sources, vegetable protein sources and combinations thereof.

9. The hypoallergenic milk according to claim 8 wherein said hypoallergenic protein comprises cereal protein selected from the group consisting of oat cereal, rice cereal, barley cereal and combinations thereof.

10. The hypoallergenic milk according to claim 2 wherein said hypoallergenic protein comprises vegetable protein sources selected from the group consisting of potato and soy isolate.

11. The hypoallergenic milk according to claim 2 wherein said hypoallergenic fat is selected from the group consisting of deproteinized butter, vegetable oil and combinations thereof.

12. The hypoallergenic milk according to claim 11 wherein said hypoallergenic fat comprises vegetable oil selected from the group consisting of milk-free margarine, sesame oil, safflower oil and combinations thereof.

13. The hypoallergenic milk according to claim 2 further comprising vitamins and minerals.

14. A process of making hypoallergenic milk comprising the steps of:
    providing whole or skim milk;
    filtering the milk through a filtration membrane without pretreating the milk to denature or hydrolyze the protein contained therein, which membrane will only allow molecules with a molecular weight less than or equal to about 5 kDa to pass therethrough;
    collecting the permeate from the filtering step;
    supplementing the permeate with hypoallergenic protein and hypoallergenic fat; and
    homogenizing the supplemented permeate.

15. A process according to claim 14 wherein the filtration membrane will only allow molecules with a molecular weight of less than or equal to about 3.5 kDa to pass therethrough.

16. A process according to claim 15 wherein the filtration membrane will only allow molecules with a molecular weight of less than or equal to about 2 kDa to pass therethrough.

17. A process according to claim 16 wherein the filtration membrane will only allow molecules with a molecular weight of less than or equal to about 1 kDa to pass therethrough.

18. The process according to claim 14 further comprising the step of:
    heating the whole milk to a temperature within the range of 40° F. to 150° F.

19. The process according to claim 18 further comprising:
    controlling the pH of the whole milk to within the range of 2 to 11.

20. The process according to claim 14 further comprising the step of:
    blending the supplemented permeate before homogenizing.

21. The process according to claim 20 further comprising the step of:
    sterilizing the homogenized permeate.

22. The process according to claim 21 further comprising the step of:
    packaging the homogenized product 23. The process according to claim 14 further comprising the step of:
    homogenizing the supplemented permeate at a pressure between about 2000 and about 4000 P.S.I.

24. The process according to claim 14 further comprising the step of:
    providing a pressure gradient across the membrane of about 5 P.S.I.

25. The process according to claim 14 wherein the filtering is by dialysis.

* * * * *

UNITED STATES PATENT AND TRADEMARK OFFICE
CERTIFICATE OF CORRECTION

PATENT NO. : 4,954,361

DATED : September 4, 1990

INVENTOR(S) : Leonard S. Girsh

It is certified that error appears in the above—identified patent and that said Letters Patent is hereby corrected as shown below:

Column 2, line 40, delete second occurrence of "is a"; line 44, "(BSA"" should be --("BSA")--; lines 45-46, "$\alpha$-lactalglobulin" should be --$\beta$-lactalglobulin--; Column 7, line 10 (Table), "3.78" should be --3.7 g--; Column 9, line 33, insert a --,-- after "protein"; Column 10, line 9, change "resistent" to --resistant--; Column 10, Claim 2, third line, after "being" insert --substantially--.

Signed and Sealed this

Third Day of March, 1992

Attest:

HARRY F. MANBECK, JR.

*Attesting Officer*     Commissioner of Patents and Trademarks